(12) United States Patent
Nishikawa

(10) Patent No.: US 8,503,039 B2
(45) Date of Patent: Aug. 6, 2013

(54) IMAGE READING APPARATUS

(75) Inventor: Hiroshi Nishikawa, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 308 days.

(21) Appl. No.: 12/981,843

(22) Filed: Dec. 30, 2010

(65) Prior Publication Data

US 2011/0164290 A1    Jul. 7, 2011

(30) Foreign Application Priority Data

Jan. 6, 2010   (JP) ................................ 2010-001107

(51) Int. Cl.
*H04N 1/04*    (2006.01)
*H04N 1/40*    (2006.01)

(52) U.S. Cl.
USPC ........... 358/461; 358/474; 358/496; 358/498; 358/486

(58) Field of Classification Search
None
See application file for complete search history.

(56) References Cited

U.S. PATENT DOCUMENTS

| | | | |
|---|---|---|---|
| 7,545,544 B2 * | 6/2009 | Tanaka et al. ................. | 358/496 |
| 2010/0085616 A1 * | 4/2010 | Shinno et al. ................. | 358/498 |
| 2010/0231992 A1 * | 9/2010 | Nomura et al. ............... | 358/498 |
| 2011/0102865 A1 * | 5/2011 | Ishida et al. ................... | 358/498 |
| 2011/0181922 A1 * | 7/2011 | Tanimoto et al. ............. | 358/474 |

FOREIGN PATENT DOCUMENTS

| | | |
|---|---|---|
| CN | 1441591 A | 9/2003 |
| JP | 06-098113 | 4/1994 |
| JP | 2002-064686 | 2/2002 |
| JP | 2002-064687 | 2/2002 |
| JP | 2004-048184 A | 2/2004 |
| JP | 2004-165758 | 6/2004 |
| JP | 2008-005377 | 1/2008 |
| JP | 2009124660 A * | 6/2009 |
| JP | 2010177746 A * | 8/2010 |
| JP | 2010187321 A * | 8/2010 |
| JP | 2011160100 A * | 8/2011 |

OTHER PUBLICATIONS

Office Action (Notice of Grounds of Rejection) dated Oct. 4, 2011, issued in the corresponding Japanese Patent Application No. 2010-001107, and an English Translation thereof.

Office Action from Chinese Patent Office dated Apr. 2, 2013, issued in corresponding Chinese Patent Appln. No. 201110006601.X, with English translation thereof (21 pages).

* cited by examiner

*Primary Examiner* — Cheukfan Lee

(74) *Attorney, Agent, or Firm* — Buchanan Ingersoll & Rooney PC

(57) ABSTRACT

In an image reading apparatus, a white reference member for obtaining a reference value used in shading correction in the reading mechanism and an elastic member for cleaning a surface of the transparent member are provided such that respective positions of the white reference member and the elastic member with respect to the transparent member are variable. A controller controls the positions of these members with respect to the transparent member to alternately achieve movement of the white reference member to a position where the white reference member faces the transparent member and movement of the elastic member to a position where the elastic member faces the transparent member. The controller calculates the above reference value using a plurality of detection values read by the reading mechanism through the above positional control.

16 Claims, 13 Drawing Sheets

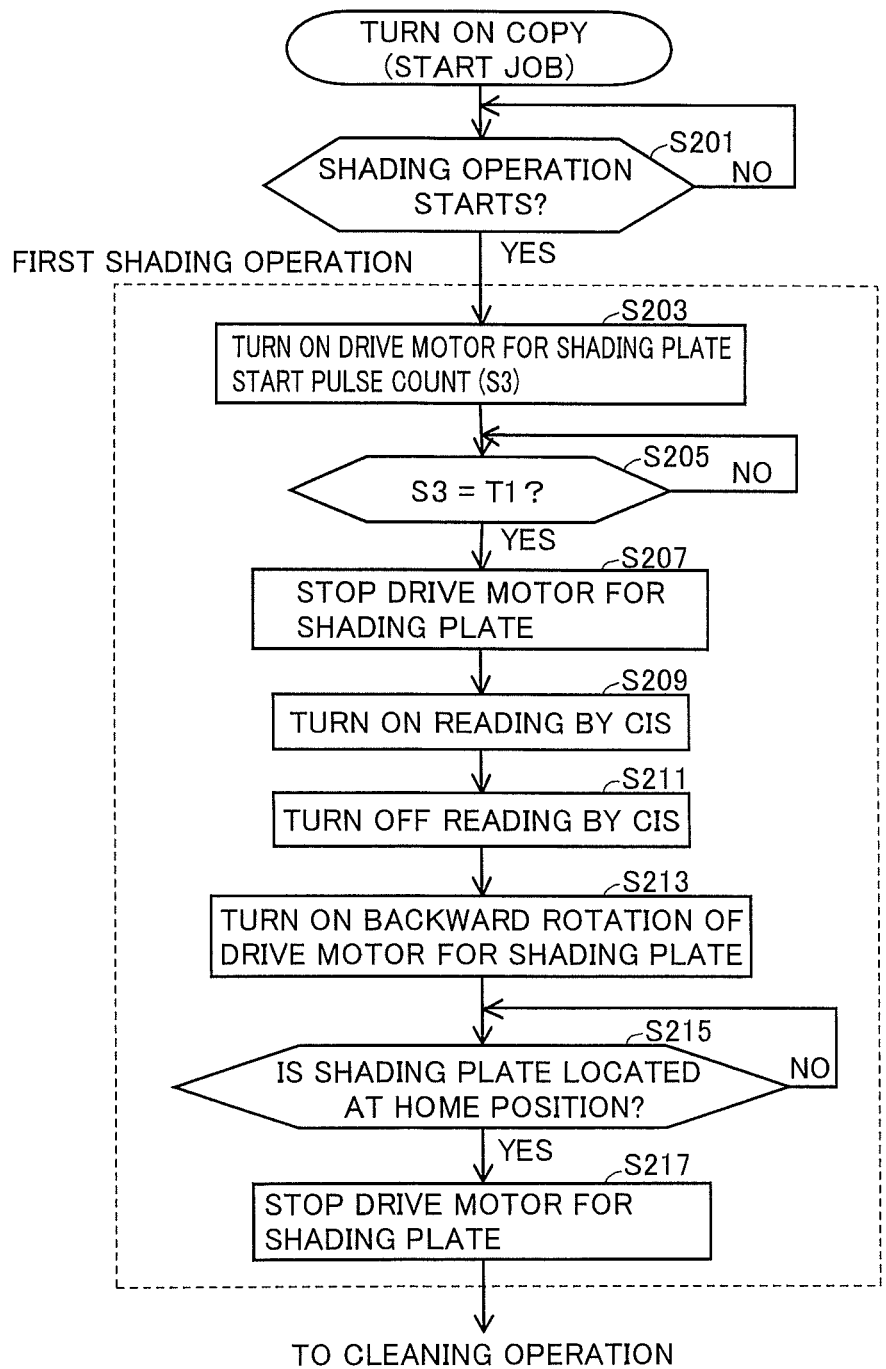

IMAGE READING APPARATUS

This application is based on Japanese Patent Application No. 2010-001107 filed with the Japan Patent Office on Jan. 6, 2010, the entire content of which is hereby incorporated by reference.

BACKGROUND OF THE INVENTION

1. Field of the Invention

The present invention relates to an image reading apparatus and a control method thereof. In particular, the present invention relates to a sheet-through type image reading apparatus and a control method thereof.

2. Description of the Related Art

As an image reading apparatus that optically reads an image on a document, a platen-set type image reading apparatus that reads an image on a document placed on a platen glass and a sheet-through type image reading apparatus that reads an image on a document while documents are conveyed one by one have been conventionally used alone or in combination. The sheet-through type image reading apparatus has advantages including size reduction, low cost, low noise, speedup of image reading, and high productivity of printing, and thus, the sheet-through type image reading apparatus has been the mainstream in monochrome copiers and color copiers.

The sheet-through type image reading apparatus is configured such that an image reading position is fixed in place, that is, onto a transparent member (elongated reading glass) and a focal point of a reading optical system is obtained on an image surface of the conveyed document through the reading glass. Therefore, the apparatus is susceptible to a foreign substance such as dust adhered onto the reading glass and dust remaining on the reading glass, and a portion where the foreign substance block light leads to an image noise streak in the read image. In the case of a paper document, a trouble that a minute foreign substance such as a fiber and a filler such as calcium carbonate included in the paper adhere to the reading glass cannot be avoided.

As a configuration for reading both the front surface and the rear surface of a document by means of the image reading apparatus, a configuration having a mechanism for turning over a document in the apparatus, thereby turning over the document whose front surface has been read and conveying the document again to an image reading position to read the rear surface has been conventionally common. This manner of reading is referred to as single scan reading.

In contrast, demand for an image reading apparatus further including a reading unit and configured to read the front surface and the rear surface of a document at the same time according to the sheet-through scheme has been expanding rapidly in recent years. This manner of reading is referred to as dual scan reading. The dual scan reading allows double-sided reading with the shortest path. Therefore, as compared with the single scan reading, the dual scan reading has advantages including high reliability and reduction in failed conveyance such as a paper jam, in addition to high productivity and low noise.

In the dual scan reading, a lightweight and compact CIS (Contact Image Sensor) is commonly used. The CIS has a feature of shallower depth of focus than that of a CCD (Charge Coupled Device).

The conveyed document must be brought as close to the CIS as possible in order that the CIS having a shallow depth of focus can read the document. In a configuration in which the document comes into strong contact with the CIS, however, an adhesive foreign substance (an adhesive substance protruding from an end face of a portion bonded by tape or glue, correction fluid, an ink lump of a pen, an eraser and the like) adhered to the document are easily transferred to the CIS. The adhesive foreign substance transferred and adhered to the CIS is not easily separated.

In a reading mechanism such as the CIS, the amount of light emitted from a lamp changes due to repeated use over the years, and thus, the reading density changes. Therefore, shading correction for reading a white color reference sheet prepared in advance before document reading, and making a correction to achieve the intended reading density is commonly made.

When the CIS having the foreign substance transferred and adhered thereto reads the white color reference sheet during shading correction, a shading value at a position where the foreign substance adheres becomes abnormal. Therefore, the density of a pixel at this position is constantly different from the density at the other positions and image noise streaks occur. The noise streaks caused by the abnormal shading value occur in all jobs affected by the shading correction value, which leads to extreme deterioration of the image quality. For example, when shading correction is made for each job before reading, image noise streaks occur on all documents in the job.

As a technique of addressing this problem, Japanese Laid-Open Patent Publication No. 2004-048184, for example, discloses a technique in which a rotating body having a white reference sheet and a cleaning member is provided at a position where the rotating body faces a CIS, and the rotating body is rotated, thereby cleaning a surface of the CIS before shading.

According to the technique in this publication, however, there is a problem that image noise streaks still occur when a foreign substance is not completely removed from the surface of the CIS by the cleaning operation.

Furthermore, there is a problem that a flaw appears on the surface of the CIS or the durability of the cleaning member declines faster when the number of the cleaning operation increases. In particular, in many cases, a reading glass of the CIS is generally subjected to the antifouling coating treatment for coating the reading glass with a substance such as Teflon® having low surface energy in order to prevent an adhesive substance from adhering to the reading glass. Therefore, there is a problem that an increase in the number of the cleaning operation leads to peeling off of the coating.

SUMMARY OF THE INVENTION

The present invention has been made in light of the above problems and one object of the present invention is to provide an image reading apparatus that achieves enhanced accuracy of shading correction and enhanced quality of a formed image, and a control method thereof.

In order to achieve the above object, according to an aspect of the present invention, an image reading apparatus includes: a transparent member provided at a reading position on a conveying path of a document; a reading mechanism for reading, through the transparent member, the document conveyed along the conveying path and passing through the reading position; a white reference member provided such that a position of the white reference member with respect to the transparent member is variable, for being read by the reading mechanism through the transparent member to obtain a reference value used in shading correction in the reading mechanism; an elastic member provided such that a position of the elastic member with respect to the transparent member is variable, for coming into contact with a surface of the transparent member facing toward the conveying path and cleaning the surface when the elastic member is located at a position where the elastic member faces the transparent member; and a controller for controlling the respective positions of the white reference member and the elastic member with respect to the transparent member and calculating the reference value. The controller controls the positions of the white reference member and the elastic member to alternately achieve movement of the white reference member to a position where the white reference member faces the transparent member and movement of the elastic member to the position where the elastic member faces the transparent member. The controller calculates the reference value using a plurality of detection values obtained by reading the white reference member by means of the reading mechanism when the white reference member is located at the position where the white reference member faces the transparent member, before and after the elastic member moves to the position where the elastic member faces the transparent member.

Preferably, the white reference member is located at a standby position different from the reading position and opposite to the reading mechanism with the transparent member and the conveying path interposed between the white reference member and the reading mechanism. The controller moves the white reference member from the standby position to the position where the white reference member faces the transparent member, when the controller moves the white reference member to the position where the white reference member faces the transparent member, and then, returns the white reference member to the standby position.

Preferably, the image reading apparatus further includes a rotating body having the white reference member and the elastic member on a surface of the rotating body. The rotating body is positioned to face the transparent member, and has a rotation axis in a plane parallel to the transparent member having a plate shape. The controller controls rotation of the rotating body to alternately achieve movement of the white reference member to the position where the white reference member faces the transparent member and movement of the elastic member to the position where the elastic member faces the transparent member.

Preferably, widths of the white reference member and the elastic member in a direction orthogonal to a conveying direction along the conveying path are each larger than a width of the document conveyed along the conveying path in the direction orthogonal to the conveying direction.

Preferably, the controller calculates the reference value using a value corresponding to lightness of the white reference member read by the reading mechanism.

Preferably, the reading mechanism includes a first reading unit for reading one surface of the document conveyed along the conveying path, and a second reading unit for reading a rear surface of the one surface without turning over the document with respect to the conveying path during reading by the first reading unit.

Preferably, the controller calculates the reference value using the plurality of detection values obtained by reading a same range of the white reference member by the reading mechanism before and after the white reference member moves to the position where the white reference member faces the transparent member.

More preferably, the controller calculates the reference value, using a maximum value or an average value of the plurality of detection values obtained by reading the same range of the white reference member by the reading mechanism before and after the white reference member moves to the position where the white reference member faces the transparent member.

According to another aspect of the present invention, a control method of an image reading apparatus includes the steps of: accepting an instruction to read a document; moving a white reference member to a position where the white reference member faces a transparent member provided at a prescribed reading position on a conveying path, and causing a reading mechanism to optically read the white reference member through the transparent member; after reading the white reference member, moving an elastic member to a position where the elastic member faces the transparent member, bringing the elastic member into contact with a surface of the transparent member facing toward the conveying path, and cleaning the surface; after cleaning, moving again the white reference member to the position where the white reference member faces the transparent member, and causing the reading mechanism to optically read the white reference member through the transparent member; and calculating a reference value used in shading correction in the reading mechanism using a plurality of detection values obtained in the step of causing the reading mechanism to optically read the white reference member when the white reference member is located at the position where the white reference member faces the transparent member, before and after the elastic member moves to the position where the elastic member faces the transparent member.

Preferably, the white reference member is located at a standby position different from the reading position and opposite to the reading mechanism with the transparent member and the conveying path interposed between the white reference member and the reading mechanism. In the step of moving a white reference member to a position where the white reference member faces a transparent member, the white reference member is moved from the standby position to the position where the white reference member faces the transparent member, and then, is returned to the standby position.

Preferably, the image reading apparatus includes a rotating body having the white reference member and the elastic member on a surface of the rotating body, and the rotating body is positioned to face the transparent member, and has a rotation axis in a plane parallel to the transparent member having a plate shape. In the step of moving a white reference member and the step of moving an elastic member, the rotating body is rotated to move the white reference member to the position where the white reference member faces the transparent member and to move the elastic member to the position where the elastic member faces the transparent member.

Preferably, widths of the white reference member and the elastic member in a direction orthogonal to a conveying direction along the conveying path are each larger than a width of the document conveyed along the conveying path in the direction orthogonal to the conveying direction.

Preferably, in the step of calculating a reference value, the reference value is calculated using a value corresponding to lightness of the white reference member read by the reading mechanism.

Preferably, the reading mechanism includes a first reading unit for reading one surface of the document conveyed along the conveying path, and a second reading unit for reading a rear surface of the one surface without turning over the document with respect to the conveying path during reading by the first reading unit.

Preferably, in the step of calculating a reference value, the reference value is calculated using the plurality of detection values obtained by reading a same range of the white reference member by means of the reading mechanism in each of the step of moving a white reference member to a position where the white reference member faces a transparent member and causing a reading mechanism to read the white reference member and the step of moving the white reference member to the position where the white reference member faces the transparent member and causing the reading mechanism to read the white reference member.

More preferably, in the step of calculating a reference value, the reference value is calculated using a maximum value or an average value of the plurality of detection values obtained by reading a same range of the white reference member by means of the reading mechanism in each of the step of moving a white reference member to a position where the white reference member faces a transparent member and causing a reading mechanism to read the white reference member and the step of moving the white reference member to the position where the white reference member faces the transparent member and causing the reading mechanism to read the white reference member.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a flowchart illustrating a specific example of a flow of control in a control unit of the image reading apparatus according to the second embodiment.

DESCRIPTION OF THE PREFERRED EMBODIMENTS

Figure 1:
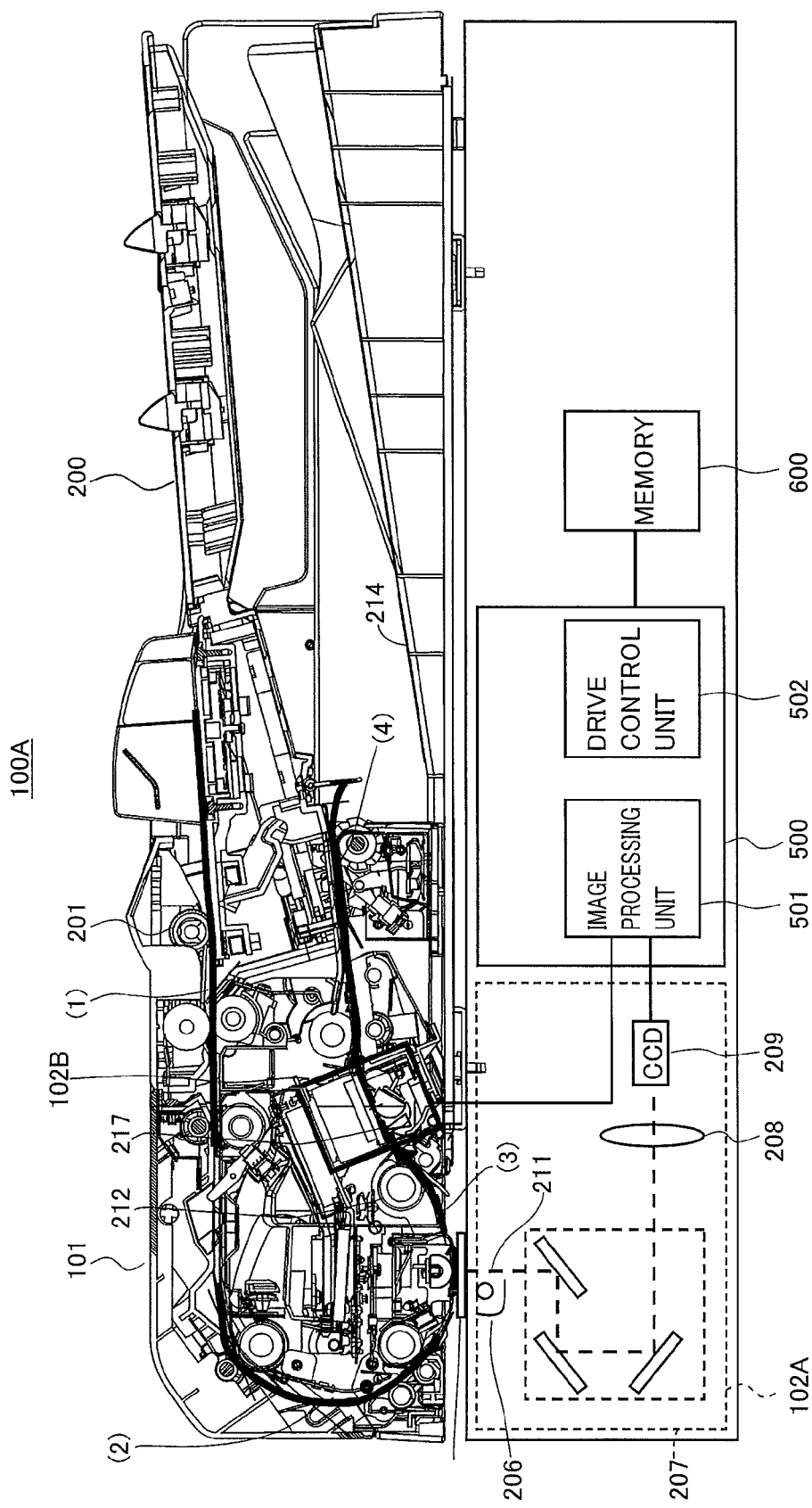
FIG. 1 illustrates a specific example of a configuration of an image reading apparatus according to a first embodiment.

Embodiments of the present invention will be described hereinafter with reference to the drawings. In the following description, the same parts and components are denoted with the same reference characters. Their names and functions are also the same.

First Embodiment

Referring to FIG. 1, an image reading apparatus 100A according to a first embodiment includes an ADF (Auto Document Feeder) unit 101 for automatically conveying a document, a first reading unit 102A and a second reading unit 102B for reading the document, and a control unit 500 for overall control and image processing.

In ADF unit 101, documents loaded onto a document tray 200 is delivered one by one to a conveying path by a paper feeding roller 201. The delivered document is conveyed through conveying paths (1) and (2) to a reading position 211 of first reading unit 102A. The document that has passed through reading position 211 is conveyed through a document conveying path (3) to second reading unit 102B by a conveying roller 212. Then, the document that has been read by second reading unit 102B passes through a conveying path (4) and is ejected to an ejection tray 214. A paper passing sensor 217 is provided in proximity to conveying roller 212 to detect conveyance of the document along the document conveying path (3).

First reading unit 102A includes a CCD (Charged Coupled Device). In other words, a light source 206 illuminates a first surface of the document passing through reading position 211, which is shown on the lower side in FIG. 1. Light of the emitted light reflected from the first surface of the document is received by a CCD sensor 209 through a reading glass 215 that is one example of a plate-like transparent member, a group of mirrors 207 and a lens 208. CCD sensor 209 converts a light receiving signal to RGB data by photoelectric conversion and outputs the RGB data to control unit 500.

Second reading unit 102B includes a CIS (Contact Image Sensor). In other words, referring to FIG. 2, a light source 301 illuminates a second surface of the document passing through a reading position 306 that is a rear surface of the first surface, that is, the surface shown on the upper side in FIG. 1. Light of the emitted light reflected from the second surface of the document is received by a CMOS (Complementary Metal Oxide Semiconductor) sensor 303 through a reading glass 302 that is one example of a plate-like transparent member. CMOS sensor 303 converts respective light receiving signals of R, G and B to the RGB data and outputs the RGB data to control unit 500.

The document is conveyed through first reading unit 102A to second reading unit 102B and the first and second surfaces are read in the respective reading units, which allows double-sided reading without turning over the document in the conveying process. In other words, first reading unit 102A and second reading unit 102B are included in a mechanism for reading both surfaces of a document.

Control unit 500 includes a not-shown CPU (Central Processing Unit), and reads and executes a program stored in a memory 600, thereby implementing an image processing unit 501 that is a function for image processing and a drive control unit 502 that is a function for controlling driving of each unit. These functions may be implemented by processing by the CPU or may be implemented by hardware such as an electrical circuit.

Image processing unit 501 produces image data based on the RGB data from first reading unit 102A and the RGB data from second reading unit 102B. The produced image data is printed and the like on an output paper and the like.

Figure 3:
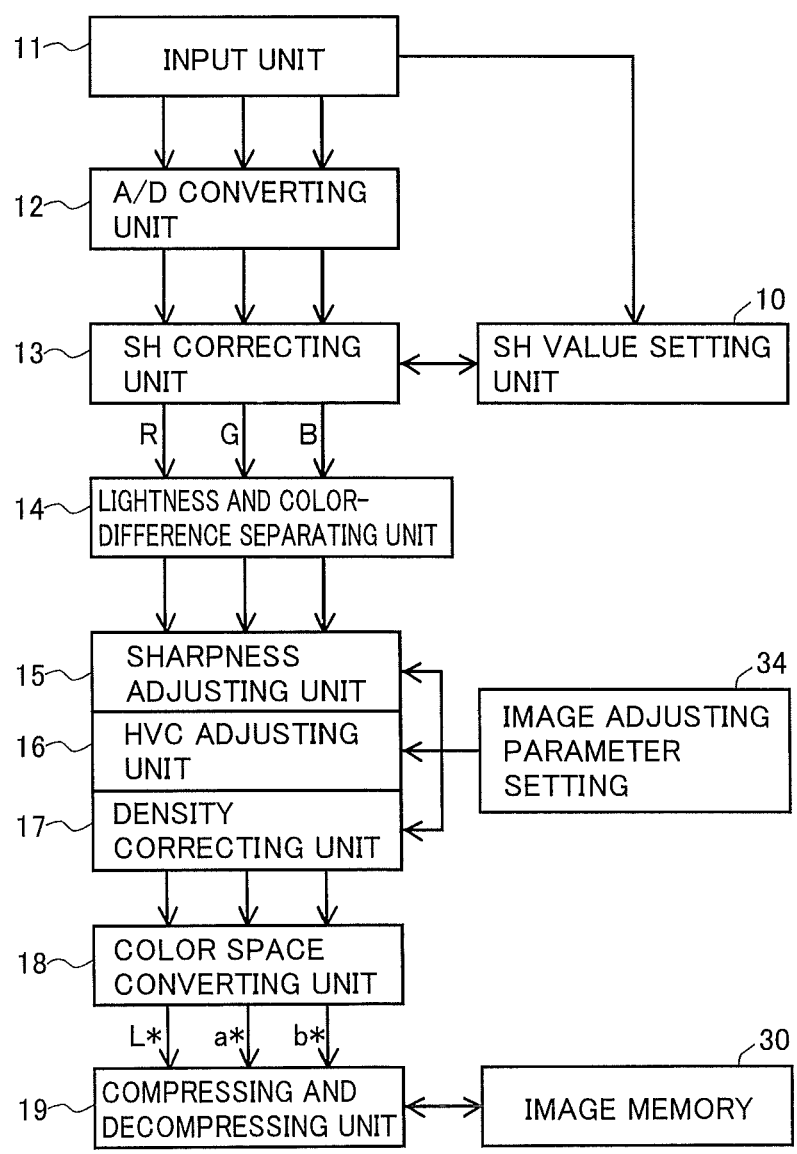
FIG. 3 is a block diagram illustrating a specific example of a functional configuration of an image processing unit included in the image reading apparatus.

Specifically, referring to FIG. 3, image processing unit 501 accepts input of the RGB data from CCD sensor 209 and the RGB data from CMOS sensor 303 at an input unit 11. The input RGB data that is analog image data is converted to digital image data in an A/D (Analog/Digital) converting unit 12.

On the other hand, input unit 11 also accepts input of the RGB data obtained at CMOS sensor 303 in accordance with a shading operation that will be described below. Based on the input RGB data obtained in accordance with the shading operation, an SH value setting unit 10 sets an SH value that is a correction factor used in shading correction processing.

An SH correcting unit 13 reads the SH value set at SH value setting unit 10, and makes a shading correction to the image data input from A/D converting unit 12. Then, SH correcting unit 13 outputs the image data to which the shading correction has been made to a lightness and color-difference separating unit 14. Lightness and color-difference separating unit 14 separates the image data into a lightness component and a color-difference component, and outputs these components to an image adjusting unit.

The image adjusting unit includes a sharpness adjusting unit 15, an HVC adjusting unit 16 and a density correcting unit 17. Sharpness adjusting unit 15 performs processing of sharpening the image, and HVC adjusting unit 16 adjusts the hue (H), the lightness (V) and the chroma (C) of the image. Density correcting unit 17 corrects the density of the image. The image adjusting unit outputs the respective processed image data of R, G and B to a color space converting unit 18. Color space converting unit 18 converts the color space of the image data from the RGB color space to the L*A*B* color space, and outputs the L*A*B* color space to a compressing and decompressing unit 19. Compressing and decompressing unit 19 compresses the image data. Compressing and decompressing unit 19 stores the compressed image data in memory 600 such as a HDD (Hard Disk Drive), or outputs the compressed image data to an external apparatus. The read image is optimized in sharpness adjusting unit 15, HVC adjusting unit 16 and density correcting unit 17 in accordance with image parameter setting 34 for adjusting the image density and the like.

Drive control unit 502 is connected to a sensor such as paper passing sensor 217 disposed within ADF unit 101, a sensor 312 (see FIG. 2) included in second reading unit 102B, a not-shown control panel and the like, and accepts input of these sensor signals and operation signals. Furthermore, drive control unit 502 is connected to be capable of communicating with a drive mechanism for paper feeding roller 201, conveying roller 212 and the like (such as a pulse motor and a motor-driven IC (Integrated Circuit) for controlling the pulse motor), a drive mechanism for first reading unit 102A and a drive mechanism for second reading unit 102B, and controls driving of these mechanisms based on the input sensor signals and operation signals.

Referring again to FIG. 2, second reading unit 102B further includes a guide 304 provided immediately on a surface of reading glass 302 through which the document passes, for guiding the document in such a manner that the image surface of the document does not come into contact with the glass surface, and a rotating body 310 provided at a position where rotating body 310 faces CMOS sensor 303 at reading position 306 with reading glass 302 interposed therebetween. It is noted that in the following description, "upstream side in the conveying direction" refers to the side with respect to reading position 306 where the document passes through paper passing sensor 217 and is fed (delivered) to reading position 306 by rotation of conveying roller 212, and "downstream side in the conveying direction" refers to the side with respect to reading position 306 where the read document is delivered from reading position 306 by rotation of conveying roller 212.

The document conveyed onto the glass surface of reading glass 302 is guided with the document put between guides 304, and is conveyed from the upstream side to the downstream side in such a manner that the image surface is not in contact with the surface of reading glass 302.

Figure 2:
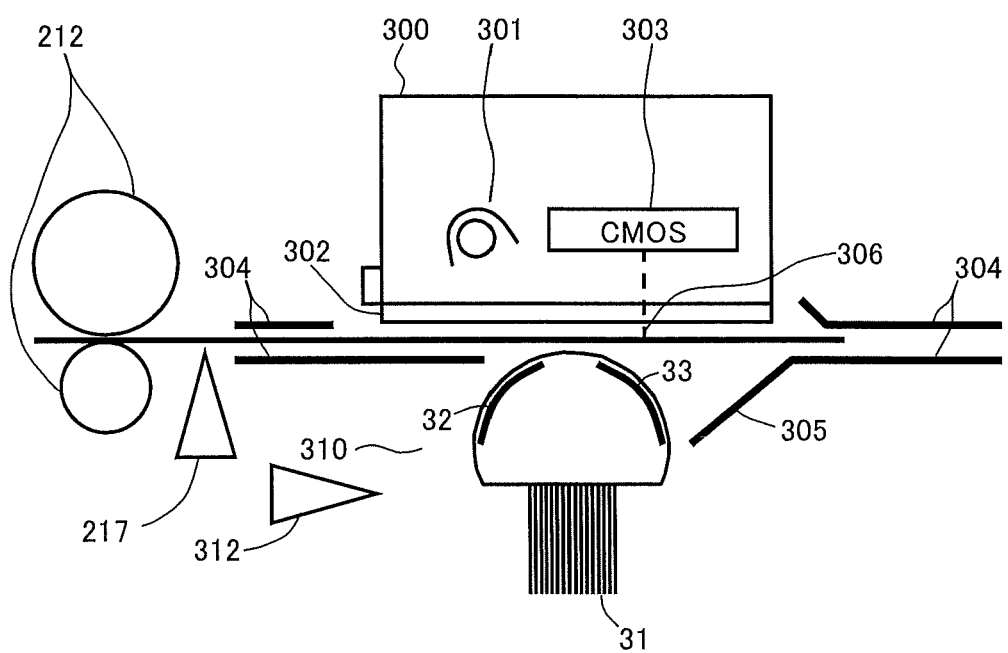
FIG. 2 illustrates a specific example of a configuration of a second reading unit including a CIS (Contact Image Sensor) included in the image reading apparatus.

As shown in FIG. 2, a part of a surface of rotating body 310 is flat and an elastically-deformable brush-like cleaning member 31 is provided on the flat surface. Cleaning member 31 is obtained, for example, by planting a conductive polyimide resin. Furthermore, a white reference surface 32 and an exposed surface 33 for shading correction are provided on the remaining surface. In addition, a stacker (duster) 305 is formed on the downstream side of guide 304 and at a position near rotating body 310.

Figure 4:
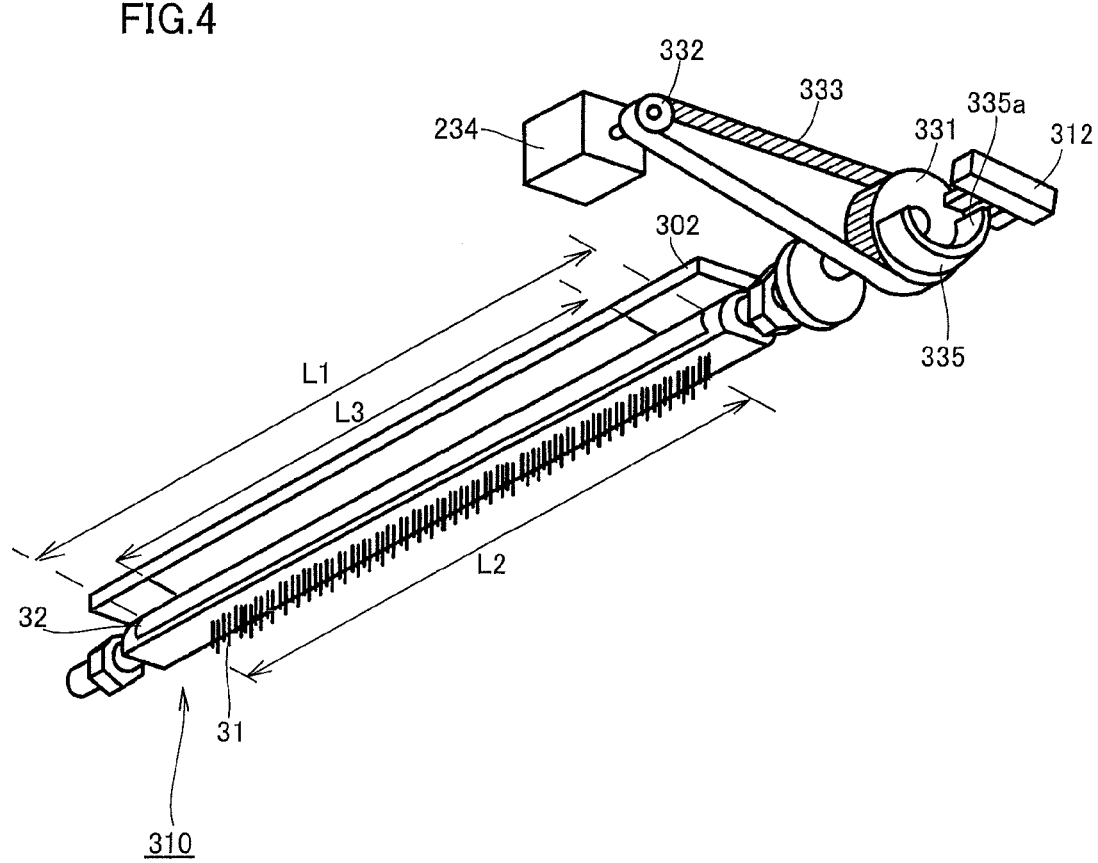
FIG. 4 illustrates a specific example of a configuration of a rotating body included in the second reading unit of the image reading apparatus.

Referring to FIG. 4, rotating body 310 is arranged such that a rotation axis thereof is parallel to the longitudinal direction of reading glass 302 (that is, CMOS sensor 303), and cleaning member 31, white reference surface 32 and exposed surface 33 are rotatably arranged to face reading position 306 of reading glass 302. Assuming an axis extending along the direction in which the document is conveyed, cleaning member 31, white reference surface 32 and exposed surface 33 all extend in a line orthogonal to this axis.

It is noted that preferably, as shown in FIG. 4, a width L2 of cleaning member 31 in the longitudinal direction of CMOS sensor 303 is larger than a width L3 of the document in the longitudinal direction of CMOS sensor 303, and a width L1 of white reference surface 32 in the longitudinal direction of CMOS sensor 303 is larger than width L2 of cleaning member 31. Since L1>L3 and L2>L3, the accuracy of correction of the reading range of the document can be ensured in the shading operation and the cleaning operation that will be described below. In addition, since L2<L1, the cost of cleaning member 31 can be saved.

Referring further to FIG. 4, a sprocket 331 fixed at one end of rotating body 310 is linked via a timing belt 333 to a sprocket 332 for output of a motor 234 serving as a drive mechanism for rotating body 310. Motor 234 is a stepping motor that can rotate forward and backward.

Rotating body 310 rotates forward and backward in accordance with a prescribed timing and speed, in association with rotation of motor 234. Motor 234 serving as the drive mechanism for rotating body 310 rotates in accordance with a control signal from control unit 500. In addition, a pulse signal indicating rotation of motor 234 is output to control unit 500. By counting this pulse signal, control unit 500 can obtain the number of rotations of motor 234, that is, the amount of rotation of rotating body 310.

Figure 5A:
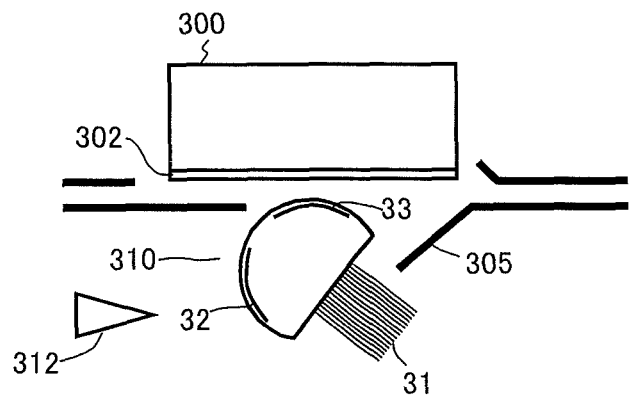
FIGS. 5A to 5C are diagrams for describing a change in positional relationship between the rotating body and a reading glass caused by rotation of the rotating body.
Figure 5B:
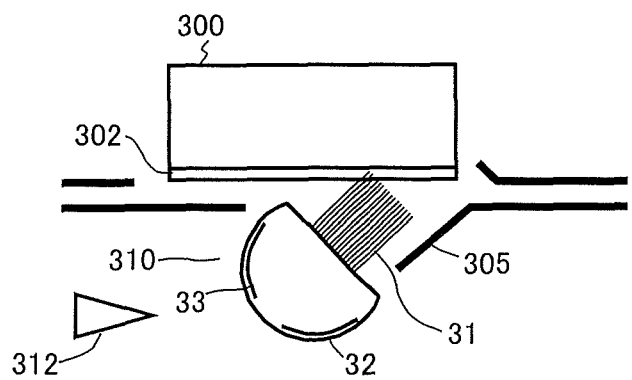
Figure 5C:
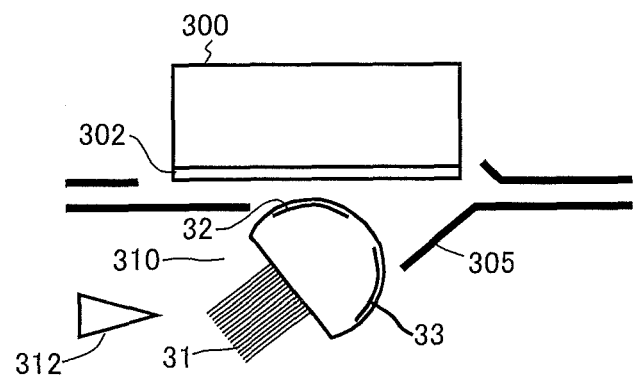

The positional relationship between rotating body 310 and reading glass 302 changes as shown in FIGS. 5A to 5C, with rotation of rotating body 310. In other words, the following three positional relationships are defined as the positional relationship between rotating body 310 and reading glass 302: a first position (FIG. 5A) where exposed surface 33 of rotating body 310 is located at a position where exposed surface 33 of rotating body 310 faces reading glass 302, and cleaning member 31 and white reference surface 32 are located at a position where cleaning member 31 and white reference surface 32 do not face reading glass 302; a second position (FIG. 5B) where cleaning member 31 is located at a position where cleaning member 31 faces reading glass 302, and white reference surface 32 and exposed surface 33 are located at a position where white reference surface 32 and exposed surface 33 do not face reading glass 302; and a third position (FIG. 5C) where white reference surface 32 is located at a position where white reference surface 32 faces reading glass 302, and cleaning member 31 and exposed surface 33 are located at a position where cleaning member 31 and exposed surface 33 do not face reading glass 302.

Rotating body 310 waits at the first position shown in FIG. 5A, which is a home position. Sensor 312 is provided in proximity to rotating body 310 of second reading unit 102B, and detects that rotating body 310 is located at the home position. The detection signal is output to control unit 500.

A method for detecting the home position by sensor 312 includes the following method by way of example. In other words, an arc-shaped projecting piece 335 is attached to sprocket 331 as shown in FIG. 4. Sensor 312 detects an end 335a of projecting piece 335, thereby detecting that cleaning member 31 is located at the home position. Other methods may be employed as the method for detecting the home position by sensor 312.

As a result of forward rotation of rotating body 310 about the axis from the upstream side to the downstream side along the direction in which the document is conveyed, the positional relationship between rotating body 310 and reading glass 302 changes from the home position (FIG. 5A) through the second position (FIG. 5B) and the third position (FIG. 5C) and returns to the home position (FIG. 5A). In association with this rotation, white reference surface 32 moves through reading position 306. If CMOS sensor 303 is in a readable state (ON) at this time, CMOS sensor 303 reads white reference surface 32 along the direction of the rotation. The sensor signal is output to control unit 500.

In addition, in association with this rotation, a tip of elastically-deformable brush-like cleaning member 31 rubs the surface of reading glass 302. As a result, a foreign substance on reading glass 302 is captured by cleaning member 31 and removed from reading position 306.

As a result of rotation of cleaning member 31 in association with this rotation, cleaning member 31 rubs reading glass 302 and then comes into contact with stacker 305. As a result, the foreign substance captured by brush-like cleaning member 31 is dusted off. The dusted-off foreign substance falls on the document conveyed on reading glass 302 and is emitted outside image reading apparatus 100A. Since stacker 305 is provided at the position near rotating body 310, the surface of reading glass 302 (in particular, reading position 306) and cleaning member 31 are constantly kept clean.

The inventor conducted an experiment using the apparatus having the configuration shown in FIG. 2 and checked the cleaning performance of the cleaning member. In the experiment, a brush-like cleaning member made of conductive nylon having a resistivity of 11.5 Log Ω was used, with one bristle having a thickness of 2 D (denier) (15.0 μm) and bristles having a density of 240 kf/inch$^2$. Width L2 in the longitudinal direction of CMOS sensor 303 was set to 309 mm, and the width in the direction in which the document was conveyed was set to 5 mm. In addition, the length of contact with reading glass 302 was set to 1.5 mm±0.5 mm, the length of contact with stacker 305 was set to 1.5 mm±0.5 mm, and the pressing force of rotating body 310 against reading glass 302 was set to 6 N (newton). Rotating body 310, that is, cleaning member 31 was rotated at a rotation speed of 302 mm/s or less.

In the experiment, rotating body 310 was rotated with paper dust dispersed uniformly on reading glass 302, and the number of paper dust remaining on reading glass 302 after rotation was checked using a microscope. The number of paper dust was checked in the range having a width of 3.5 mm with respect to the center of rotation.

Figure 6:
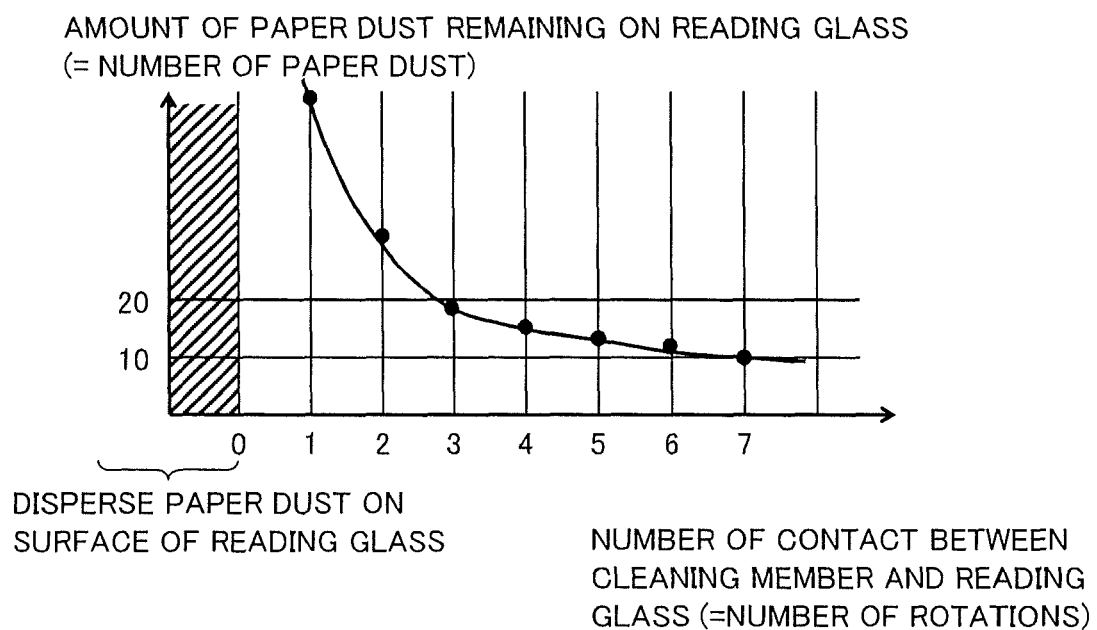
FIG. 6 illustrates a relationship between the number of rotations of the rotating body and the amount of paper dust remaining on a surface of the reading glass, which is obtained from an experiment by the inventor.

In the experiment, a phenomenon was seen, in which paper dust dusted off by stacker 305 floated in the air and a part of the paper dust adhered again to the surface of reading glass 302. In addition, a phenomenon was seen, in which paper dust that had entered brush-like cleaning member 31 was not dusted off by stacker 305 and the paper dust adhered again to the surface of reading glass 302 when the tip of cleaning member 31 rubbed the surface of reading glass 302 again. In other words, the phenomenon was seen, in which the surface of reading glass 302 was cleaned, and at the same time, another paper dust adhered, as a result of the rotation. Consequently, the relationship between the number of rotations of rotating body 310 and the amount of paper dust remaining on the surface of reading glass 302 as shown in FIG. 6 was obtained. The experimental result shown in FIG. 6 showed that the surface of reading glass 302 was cleaned as the number of rotations of rotating body 310 increased, while complete removal of paper dust (reduction in the number of the paper dust to zero) was difficult.

On the other hand, the inventor calculated the frequency of occurrence of noise streaks when some high-quality papers actually distributed in the market passed through the image reading apparatus. Specifically, the inventor selected six types of high-quality papers distributed in large amounts in the market, that is, a paper A (unit weight: 80 g/m$^2$, size: 210 mm×297 mm), a paper B (unit weight: 64 g/m$^2$, size: 210 mm×297 mm), a paper C (unit weight: 80 g/m$^2$, size: 210 mm×297 mm), a paper D (unit weight: 80 g/m$^2$, size: 210 mm×297 mm), a paper E (unit weight: 90 g/m$^2$, size: 215.9 mm×279.4 mm), and a paper F (unit weight: 80 g/m$^2$, size: 215.9 mm×279.4 mm). The inventor used, as a document, a high-quality paper on which a particular image was printed, and caused the image reading apparatus to convey and read 500 sheets of each type of the high-quality papers. At this time, the inventor caused the cleaning operation to be performed every time one sheet passes, changed the number of rotations of rotating body 310 (that is, cleaning member 31) in one cleaning operation, and counted the number of sheets on which noise streaks occurred for each number of rotations.

Figure 7:
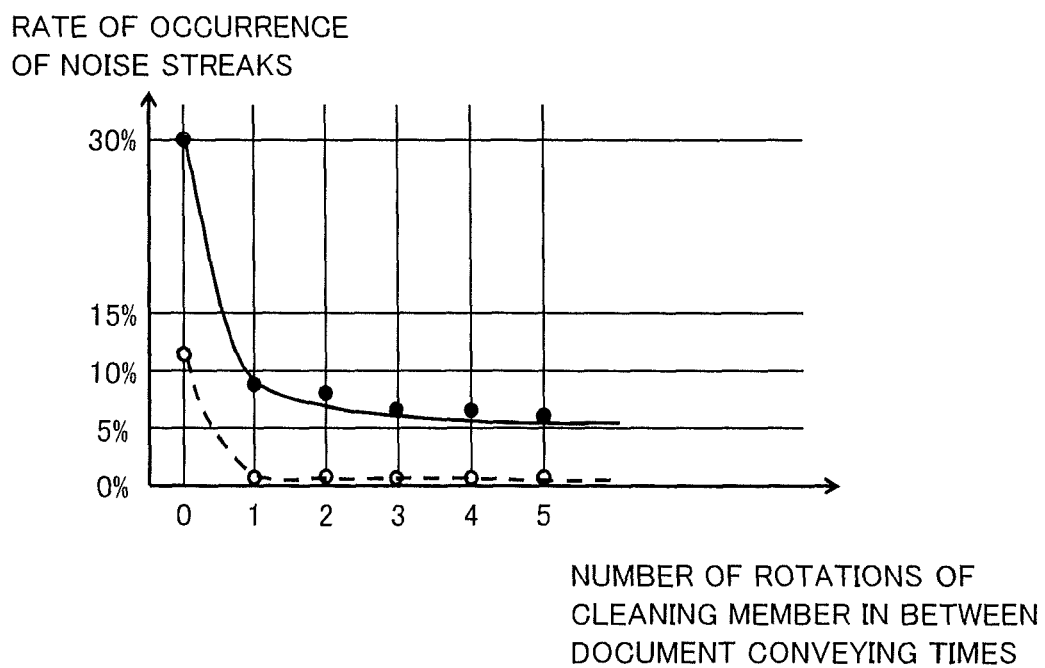
FIG. 7 illustrates a relationship between the number of rotations of the rotating body in one cleaning operation and the frequency of occurrence of noise, as well as a relationship between the number of rotations of the rotating body in one cleaning operation and the frequency of continuous occurrence of noise on the same pixel, both of which are obtained from the experiment by the inventor.

Consequently, the relationship between the number of rotations of rotating body 310 in one cleaning operation and the frequency of occurrence of noise as shown by a solid line in FIG. 7 was obtained. Here, the frequency of occurrence of noise is expressed as a ratio (%) of the number of sheets on which noise streaks occurred to the total number of conveyed and read sheets, that is, a value obtained by dividing the number of sheets on which noise streaks occurred by the total number of conveyed and read sheets (here, 3000 sheets), and multiplying the result by 100%. The experimental result shown by the solid line in FIG. 7 showed that the frequency of occurrence of noise, that is, the frequency with which paper dust remained on the surface of reading glass 302 decreased as the number of rotations of rotating body 310 in one cleaning operation increased, while it was difficult to decrease the frequency to 5% or less, which was the limit.

In addition, the inventor counted the number of sheets on which noise streaks occurred continuously at the same position (on a pixel) after one cleaning operation and after the next cleaning operation. Consequently, the relationship between the number of rotations of rotating body 310 in one cleaning operation and the frequency of continuous occurrence of noise on the same pixel as shown by a dotted line in FIG. 7 was obtained. In other words, the experimental result was obtained, that the frequency with which noise streaks occurred continuously at the same pixel position as a result of one or more rotations of rotating body 310 was 0.01%. The experimental result shown by the dotted line in FIG. 7 showed that the frequency with which noise streaks occurred continuously at the same pixel position was extremely low.

A mechanism that the frequency with which noise streaks occur continuously at the same pixel position is extremely low is considered as follows. Based on the experimental result, the probability of a foreign substance adhering to any pixel position in a paper having a width of 210 mm×297 mm and a dot density of 600 dpi (about 7016 pixels) is known to be 10%. Therefore, the probability of a foreign substance continuously adhering to an arbitrary pixel position is calculated as 0.0014%, which is obtained by dividing 10% by 7016. This value matches the above-described experimental result.

Control unit 500 causes the shading operation at a prescribed timing such as at startup of image reading apparatus 100A, before start of a job, and in between paper passing times, and causes SH value setting unit 10 to set the SH value used in shading correction. Here, the shading operation refers to an operation for obtaining the RGB data used by SH value setting unit 10 to set the above-described SH value, and specifically, an operation for causing CMOS sensor 303 to read white reference surface 32 prepared in advance as a white color reference. SH value setting unit 10 sets a correction value for using, as the white color reference, the RGB data obtained at this time. When a foreign substance adheres to reading glass 302 in the shading operation, the SH value at the pixel position corresponding to the position where the foreign substance adheres may become abnormal. Even if rotating body 310 is rotated and cleaning member 31 cleans the surface of reading glass 302 before the shading operation, complete removal of the foreign substance such as paper dust from the surface of reading glass 302 is difficult as verified in the above-described experiment, and thus, the SH value remains abnormal. The abnormal SH value causes noise streaks on all images read until the next shading correction is made, which leads to quality deterioration.

Thus, control unit 500 causes the shading operation using the principle verified as described above. In other words, drive control unit 502 of control unit 500 causes the cleaning operation and the shading operation alternately, and image processing unit 501 of control unit 500 compares the RGB data obtained from continuous two shading operations with the cleaning operation interposed therebetween, that is, the shading operation before the cleaning operation and the shading operation after this cleaning operation, and sets the SH value.

Figure 8:
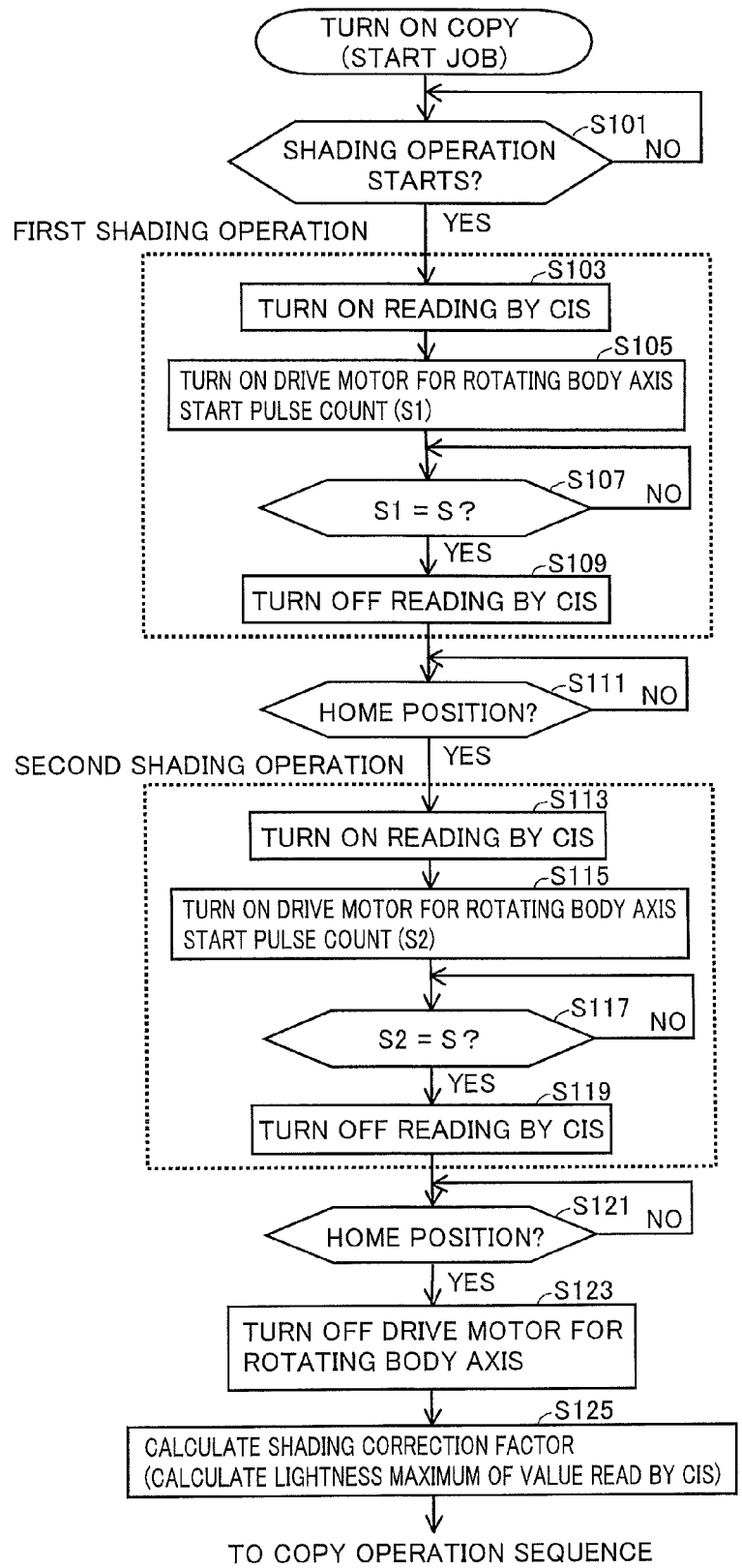
FIG. 8 is a flowchart illustrating a specific example of a flow of control in a control unit of the image reading apparatus according to the first embodiment.

Specifically, referring to FIG. 8, upon acceptance of an instruction signal for providing an instruction to start reading (for example, to start copying and the like) from the not-shown control panel and the like, control unit 500 starts execution of a job and starts a series of operations. In the standby state before the series of operations start, rotating body 310 is maintained at the home position (FIG. 5A) with respect to reading glass 302.

When control unit 500 starts the job, control unit 500 monitors the progress thereof and determines when the predefined shading operation start time is, such as before reading of the first document in the job and after reading of the prescribed number of sheets, for example (step (hereinafter referred to as "S") 101). When the shading operation start time comes (YES in S101), drive control unit 502 causes the first shading operation (S103 to S109) to start.

In the first shading operation, drive control unit 502 outputs a control signal for providing an instruction to start reading to CMOS sensor 303 and sensing starts in S103. In S105, drive control unit 502 outputs a control signal to the drive mechanism (such as motor 234) for rotating rotating body 310 and rotation driving starts. In addition, drive control unit 502 starts counting the pulse signal from the drive mechanism for rotating body 310.

When a count value S1 of the pulse signal from the drive mechanism for rotating body 310 has reached a value S corresponding to the amount of rotation of rotating body 310 from the home position stored in advance to the position when white reference surface 32 has passed through reading position 306 (YES in S107), that is, when rotating body 310 has rotated to the position when white reference surface 32 has passed through reading position 306, drive control unit 502 outputs a control signal for providing an instruction to end reading to CMOS sensor 303 and sensing ends in S109.

Thereafter, when control unit 500 detects that rotating body 310 has rotated to the home position, based on the sensor signal input from sensor 312 (YES in S111), drive control unit 502 causes the second shading operation (S113 to S119) to start. The second shading operation is the same as the first shading operation (S103 to S109).

When the two shading operations are completed and then control unit 500 detects that rotating body 310 has rotated to the home position (YES in S121), drive control unit 502 of control unit 500 outputs a control signal to the drive mechanism for rotating body 310 and the rotation driving ends in S123. In S125, image processing unit 501 compares the lightness at the same pixel position, which is indicated by the sensor signals obtained by reading white reference surface 32 by means of CMOS sensor 303 during the two shading operations, and sets the SH value for each pixel position, using a value (maximum value) of the sensor signal indicating higher lightness, that is, a value of the sensor signal detected as closer to the white color. In the following, the copy operation sequence is performed in accordance with an instruction signal from the not-shown control panel and the like.

As a result of the above-described series of control for setting the SH value in control unit 500, rotating body 310 makes one rotation from the home position (FIG. 5A) through the second position (FIG. 5B) immediately before CMOS sensor 303 reads white reference surface 32 in the first shading operation. As a result, cleaning member 31 cleans the surface of reading glass 302. Thereafter, rotating body 310 returns to the home position (FIG. 5A) after reading of white reference surface 32. As a result, in the first shading operation, rotating body 310 makes one rotation in the direction opposite to the direction in which the document is conveyed. Subsequently, rotating body 310 further makes another rotation in the second shading operation as well. Accordingly, the cleaning operation is performed between the first shading operation and the second shading operation, and cleaning member 31 cleans the surface of reading glass 302 during the cleaning operation.

As verified in the experiment by the inventor, complete removal of a foreign substance from the surface of reading glass 302 is difficult only with cleaning by cleaning member 31. The probability, however, of the foreign substance remaining adhered to the same pixel position before and after cleaning is extremely low. Therefore, the foreign substance can affect both of the sensor signal (also referred to as a first sensor signal) obtained in the first shading operation and the sensor signal (also referred to as a second sensor signal) obtained in the second shading operation. There is, however, an extremely low possibility that the foreign substance affects the sensor signals corresponding to the same pixel position, of the first sensor signal and the second sensor signal. Therefore, by comparing these and setting the SH value using a value of the sensor signal indicating higher lightness, the SH value is set using the sensor signal that is not affected by the foreign substance, for the sensor signals corresponding to all pixel positions. This is probably because, even if one sensor signal is affected by the foreign substance, the other sensor signal is not affected by the foreign substance. In other words, the SH value can be set without an influence of the foreign substance. As a result, noise streaks occurring on an image when the SH value affected by the foreign substance is used can be prevented and the image quality can be enhanced.

Second Embodiment

In image reading apparatus 100A according to the first embodiment, the rotating body is provided with the white reference surface and the cleaning member, and rotation of the rotating body is controlled to control the timing of reading the white reference surface and the timing of cleaning. This manner of the white reference surface and the cleaning member in image reading apparatus 100A is, however, one example, and is not limited to the example in which the rotating body is provided with the white reference surface and the cleaning member. The white reference surface and the cleaning member may be provided in another manner.

Figure 10A:
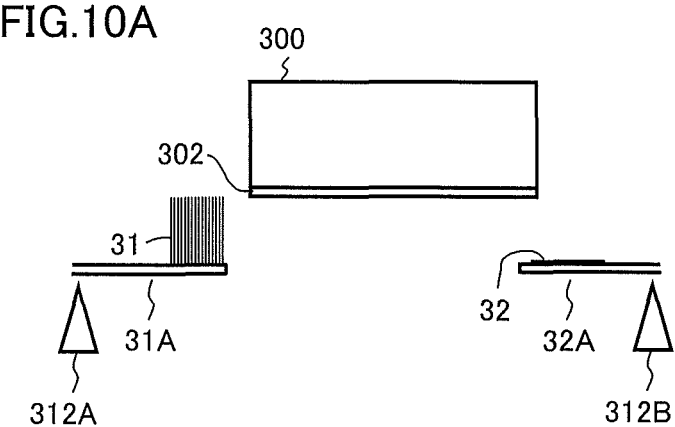
FIGS. 10A to 10C are diagrams for describing a change in positional relationship between a reading glass and a cleaning plate as well as a shading plate included in the second reading unit of the image reading apparatus according to the second embodiment.
Figure 10B:
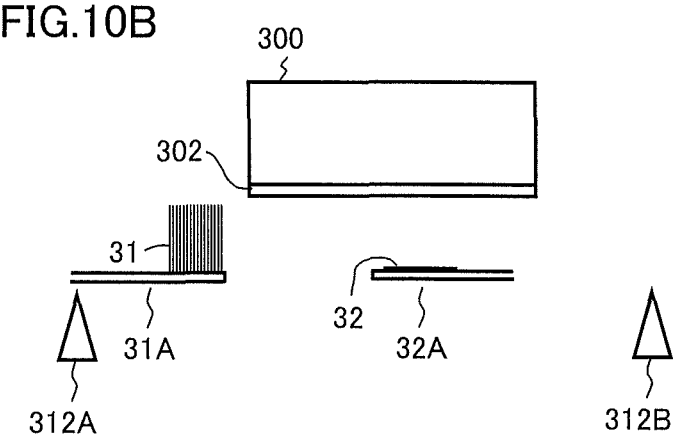
Figure 10C:
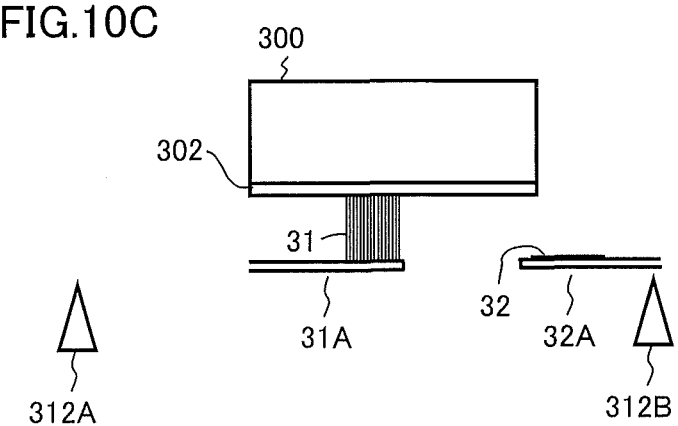

As another example, in an image reading apparatus 100B according to a second embodiment, second reading unit 102B includes a cleaning plate 31A having cleaning member 31, and a shading plate 32A having white reference surface 32, instead of rotating body 310. Second reading unit 102B includes a sensor 312A and a sensor 312B, instead of sensor 312. Cleaning plate 31A and shading plate 32A are connected to not-shown drive mechanisms including a not-shown motor and the like, respectively, and can move in parallel to the direction in which the document is conveyed, as shown in FIGS. 10A to 10C. The drive mechanisms for cleaning plate 31A and shading plate 32A are connected to control unit 500, respectively, and drive cleaning plate 31A and shading plate 32A in accordance with the control signal from control unit 500. In addition, the pulse signal indicating rotation of the not-shown motors serving as the drive mechanisms for cleaning plate 31A and shading plate 32A is output to control unit 500. By counting this pulse signal, control unit 500 can obtain the amount of movement of each of cleaning plate 31A and shading plate 32A.

The following three positional relationships are defined as the positional relationship between reading glass 302 and cleaning plate 31A as well as shading plate 32A: a first position (FIG. 10A) where both of cleaning member 31 and white reference surface 32 are located at a position where cleaning member 31 and white reference surface 32 do not face reading glass 302; a second position (FIG. 10B) where white reference surface 32 is located at a position where white reference surface 32 faces reading glass 302 and cleaning member 31 is located at a position where cleaning member 31 does not face reading glass 302; and a third position (FIG. 10C) where cleaning member 31 is located at a position where cleaning member 31 faces reading glass 302 and white reference surface 32 is located at a position where white reference surface 32 does not face reading glass 302.

Cleaning plate 31A and shading plate 32A wait at a position apart from reading position 306 during document conveying and in between jobs, with the first position shown in FIG. 10A being the home position for each of cleaning plate 31A and shading plate 32A. Sensor 312A is provided in proximity to cleaning plate 31A and sensor 312B is provided in proximity to shading plate 32A. Sensor 312A and sensor 312B detect that cleaning plate 31A and shading plate 32A are located at the home position, respectively. The detection signal is output to control unit 500.

As a result of operation of cleaning plate 31A by the drive mechanism, cleaning plate 31A moves from the home position (FIG. 10A) to the third position (FIG. 10C), and then, returns to the home position (FIG. 10A) again. In association with this movement of cleaning plate 31A, the tip of elastically-deformable brush-like cleaning member 31 rubs the surface of reading glass 302. As a result, a foreign substance on reading glass 302 is captured by cleaning member 31 and removed from reading position 306.

As a result of operation of shading plate 32A by the drive mechanism, shading plate 32A moves from the home position (FIG. 10A) to the second position (FIG. 10B), and then, returns to the home position (FIG. 10A) again. If CMOS sensor 303 is in a readable state (ON) during this movement of shading plate 32A, CMOS sensor 303 reads white reference surface 32 along the direction of the movement. The sensor signal is output to control unit 500.

Control unit 500 of image reading apparatus 100B also causes the cleaning operation and the shading operation alternately, using the principle verified as described above. Image processing unit 501 compares the RGB data obtained from continuous two shading operations with the cleaning operation interposed therebetween, that is, the shading operation before the cleaning operation and the shading operation after this cleaning operation, and sets the SH value.

Specifically, referring to FIG. 11, upon acceptance of an instruction signal for providing an instruction to start reading (for example, to start copying and the like) from the not-shown control panel and the like, control unit 500 starts execution of a job and starts a series of operations. In the standby state before the series of operations start, cleaning plate 31A and shading plate 32A are maintained at the home position (FIG. 10A) with respect to reading glass 302.

When control unit 500 starts the job, control unit 500 monitors the progress thereof and determines when the pre-defined shading operation start time is (S201). When the shading operation start time comes (YES in S201), drive control unit 502 causes the first shading operation (S203 to S217) to start.

In the first shading operation, drive control unit 502 outputs a control signal to the drive mechanism for shading plate 32A and the operation of shading plate 32A starts in S203. In addition, drive control unit 502 starts counting the pulse signal from the drive mechanism for shading plate 32A.

When a count value S3 of the pulse signal from the drive mechanism for shading plate 32A has reached a value T1 corresponding to the amount of movement of shading plate 32A from the home position of shading plate 32A stored in advance to the position where white reference surface 32 faces reading glass 302 (YES in S205), drive control unit 502 outputs a control signal to the drive mechanism for shading plate 32A and the operation of shading plate 32A stops in S207. At this point, white reference surface 32 is located at the position where white reference surface 32 faces reading glass 302. In this state, in S209, drive control unit 502 outputs a control signal for providing an instruction to start reading to CMOS sensor 303 and sensing starts. Then, in S211 when sensing of white reference surface 32 is completed, drive control unit 502 outputs a control signal for providing an instruction to end reading to CMOS sensor 303 and sensing ends.

Thereafter, in S213, drive control unit 502 outputs the control signal to the drive mechanism for shading plate 32A and the operation of shading plate 32A starts. The direction of operation at this time is opposite to the direction of operation in S203. As a result, shading plate 32A located at the position where white reference surface 32 faces reading glass 302 moves toward the home position. When it is detected that shading plate 32A has moved to the home position (YES in S215), drive control unit 502 outputs the control signal to the drive mechanism for shading plate 32A and the operation of shading plate 32A stops in S217. As a result, cleaning plate 31A and shading plate 32A both return to the home position with respect to reading glass 302, and the first shading operation ends.

Figure 12:
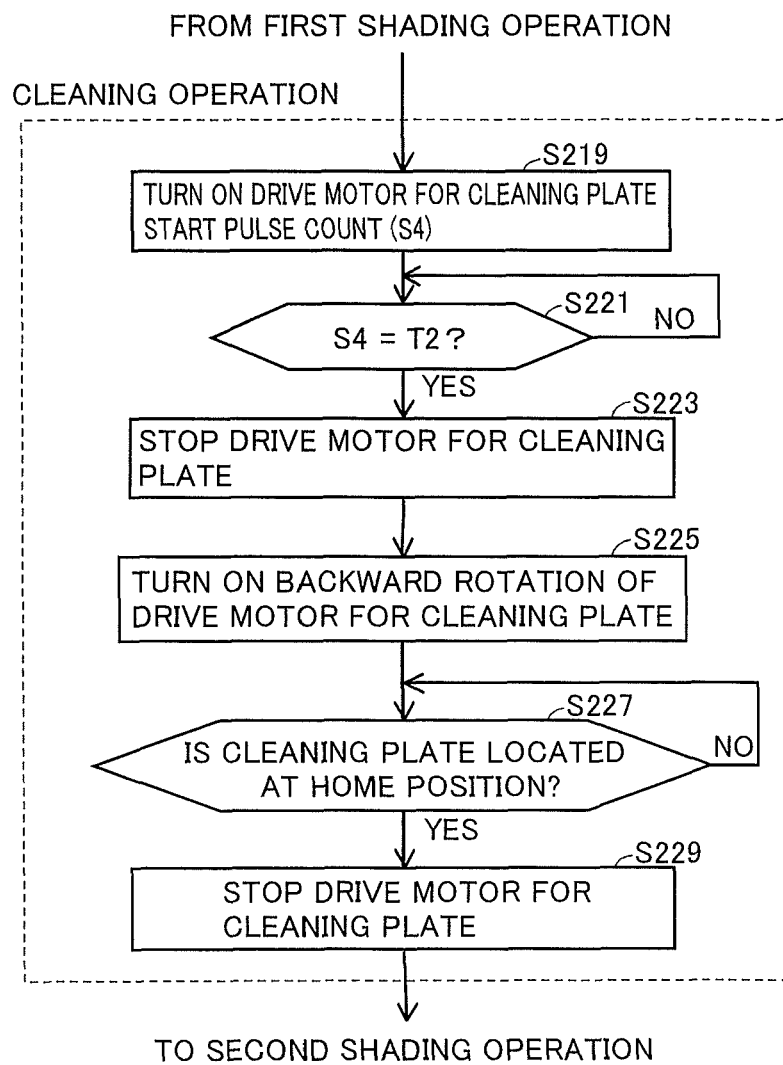
FIG. 12 is a flowchart illustrating a specific example of a flow of control in the control unit of the image reading apparatus according to the second embodiment.

Next, referring to FIG. 12, when the first shading operation ends, drive control unit 502 of control unit 500 causes the cleaning operation (S219 to S229) to start.

In the cleaning operation, drive control unit 502 outputs a control signal to the drive mechanism for cleaning plate 31A and the operation of cleaning plate 31A starts in S219. In addition, drive control unit 502 starts counting the pulse signal from the drive mechanism for cleaning plate 31A.

When a count value S4 of the pulse signal from the drive mechanism for cleaning plate 31A has reached a value T2 corresponding to the amount of movement of cleaning plate 31A from the home position of cleaning plate 31A stored in advance to the position where cleaning member 31 faces reading glass 302 (YES in S221), drive control unit 502 outputs a control signal to the drive mechanism for cleaning plate 31A and the operation of cleaning plate 31A stops in S223, and then, the operation of cleaning plate 31A restarts in S225. The direction of operation at this time is opposite to the direction of operation in S219. As a result, cleaning member 31 reciprocates in contact with the surface of reading glass 302, and cleaning member 31 cleans the surface of reading glass 302.

When it is detected that cleaning plate 31A has moved to the home position (YES in S227), drive control unit 502 outputs the control signal to the drive mechanism for cleaning plate 31A and the operation of cleaning plate 31A stops in S229. As a result, cleaning plate 31A and shading plate 32A both return to the home position with respect to reading glass 302, and the cleaning operation ends.

Figure 13:
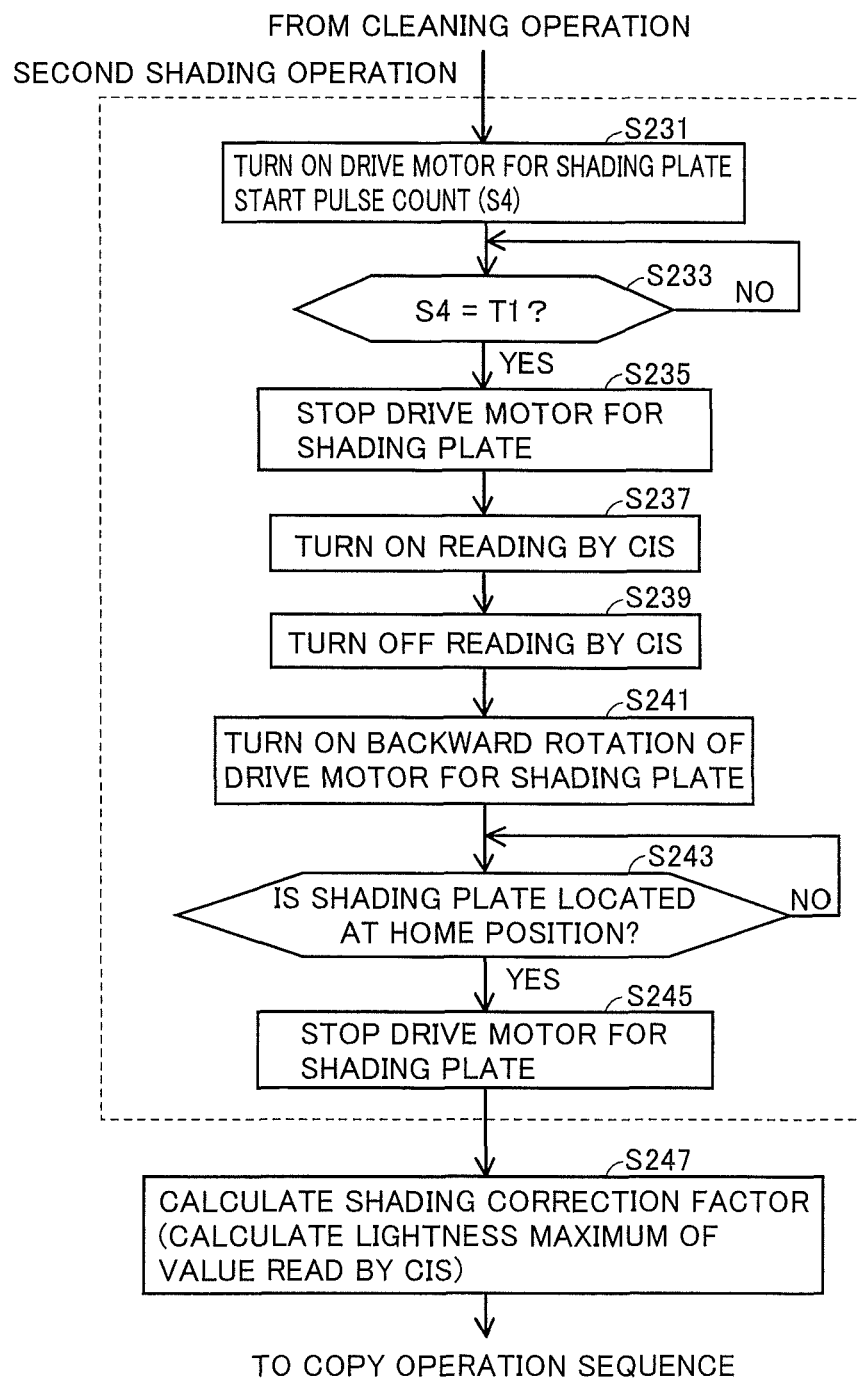
FIG. 13 is a flowchart illustrating a specific example of a flow of control in the control unit of the image reading apparatus according to the second embodiment.

Next, referring to FIG. 13, when the cleaning operation ends, drive control unit 502 of control unit 500 causes the second shading operation (S231 to S245) to start. The second shading operation is the same as the first shading operation (S203 to S217).

When the two shading operations are completed, in S245, image processing unit 501 of control unit 500 compares the lightness at the same pixel position, which is indicated by the sensor signals obtained by reading white reference surface 32 by means of CMOS sensor 303 during the two shading operations, and sets the SH value for each pixel position, using a value (maximum value) of the sensor signal indicating higher lightness, that is, a value of the sensor signal detected as closer to the white color. The processing here is the same as the processing in S125 as described above. In the following, the copy operation sequence is performed in accordance with an instruction signal from the not-shown control panel and the like.

Figure 9:
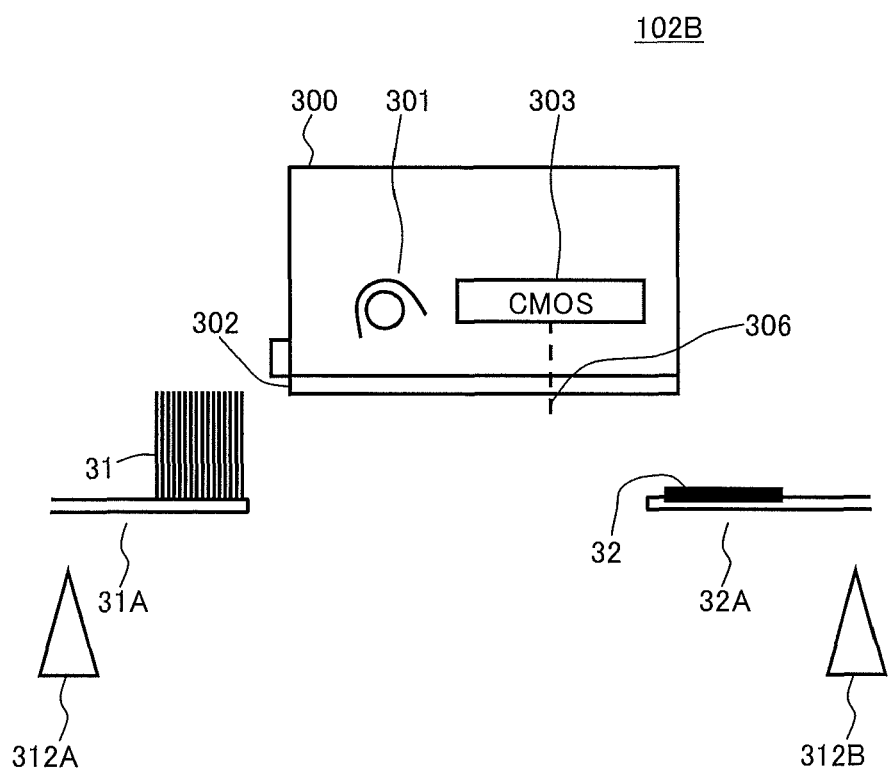
FIG. 9 illustrates a specific example of a configuration of a second reading unit of an image reading apparatus according to a second embodiment.

Even when cleaning member 31 and white reference surface 32 are configured as shown in FIG. 9, the cleaning operation is performed between the first shading operation and the second shading operation as a result of control by control unit 500 as shown in FIGS. 11 to 13, and cleaning member 31 cleans the surface of reading glass 302 during the cleaning operation. Since the SH value is set using a value of the sensor signal indicating higher lightness, that is, a value of the sensor signal detected as closer to the white color, of the sensor signals corresponding to the same pixel position obtained before and after the cleaning operation as described above, noise streaks occurring on an image when the SH value affected by a foreign substance is used can be prevented and the image quality can be enhanced.

In the above example, the SH value is set using a value (maximum value) of the sensor signal indicating higher lightness, of the sensor signals corresponding to the same pixel position obtained before and after the cleaning operation. The SH value, however, may be set using other prescribed operation values such as an average value of the lightness indicated by the sensor signals corresponding to the same pixel position obtained before and after the cleaning operation. Furthermore, the shading operation to be performed is not limited to twice, and two or more shading operations may be performed with the cleaning operation interposed therebetween and the SH value may be set using two or more values obtained from these shading operations.

In addition, in the above example, control of the shading operation and the cleaning operation to set the SH value used in shading correction in second reading unit 102B has been described. Similar configuration, however, may also be included and similar control may also be performed in first reading unit 102A, instead of second reading unit 102B or in addition to second reading unit 102B. As explained above, however, by performing the above-described control in, particularly, a CIS-type reading mechanism (second reading unit 102B) in which a foreign substance adheres more easily than in a CCD-type reading mechanism, the effect of further enhancement of the image quality is obtained.

Furthermore, a program for controlling image reading apparatus 100A or image reading apparatus 100B that is executed in above-described control unit 500 may also be provided. Such program may also be recorded in a computer-readable recording medium such as a flexible disk, a CD-ROM (Compact Disk-Read Only Memory), a ROM (Read Only Memory) a RAM (Random Access Memory), and a memory card attached to a computer, and may be provided as a program product, Alternatively, the program may also be provided as being recorded in a recording medium such as a hard disk included in a computer. Alternatively, the program may also be provided as being downloaded through a network.

The program may be a program that calls a required module in a prescribed array at a prescribed timing from among program modules provided as a part of an operating system (OS) of a computer, and causes the module to perform processing. In this case, the above module is not included in the program itself and the processing is performed in cooperation with the OS. Such program that does not include the module may also be included in the program.

The program may be provided as being incorporated into a part of another program. In this case as well, a module included in another program as described above is not included in the program itself and the processing is performed in cooperation with another program. Such program incorporated into another program may also be included in the program.

The provided program product is installed and executed in a program storage unit such as a hard disk. It is noted that the program product includes a program itself and a recording medium having the program recorded thereon.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image reading apparatus, comprising:
    a transparent member provided at a reading position on a conveying path of a document;
    a reading mechanism for reading, through said transparent member, the document conveyed along said conveying path and passing through said reading position;
    a white reference member provided such that a position of said white reference member with respect to said transparent member is variable, for being read by said reading mechanism through said transparent member to obtain a reference value used in shading correction in said reading mechanism;
    an elastic member provided such that a position of said elastic member with respect to said transparent member is variable, for coming into contact with a surface of said transparent member facing toward said conveying path and cleaning the surface when said elastic member is located at a position where said elastic member faces said transparent member; and
    a controller for controlling the respective positions of said white reference member and said elastic member with respect to said transparent member and calculating said reference value, wherein
    said controller
    controls the positions of said white reference member and said elastic member to alternately achieve movement of said white reference member to a position where said white reference member faces said transparent member and movement of said elastic member to the position where said elastic member faces said transparent member, and
    calculates said reference value using a plurality of detection values obtained by reading said white reference member by means of said reading mechanism when said white reference member is located at the position where said white reference member faces said transparent member, before and after said elastic member moves to the position where said elastic member faces said transparent member.

2. The image reading apparatus according to claim 1, wherein
    said white reference member is located at a standby position different from said reading position and opposite to said reading mechanism with said transparent member and said conveying path interposed between said white reference member and said reading mechanism, and
    said controller moves said white reference member from said standby position to the position where said white reference member faces said transparent member, when said controller moves said white reference member to the position where said white reference member faces said transparent member, and then, returns said white reference member to said standby position.

3. The image reading apparatus according to claim 1, further comprising
    a rotating body having said white reference member and said elastic member on a surface of said rotating body, wherein
    said rotating body is positioned to face said transparent member, and has a rotation axis in a plane parallel to said transparent member having a plate shape, and
    said controller controls rotation of said rotating body to alternately achieve movement of said white reference member to the position where said white reference member faces said transparent member and movement of said elastic member to the position where said elastic member faces said transparent member.

4. The image reading apparatus according to claim 1, wherein
    widths of said white reference member and said elastic member in a direction orthogonal to a conveying direction along said conveying path are each larger than a width of the document conveyed along said conveying path in the direction orthogonal to said conveying direction.

5. The image reading apparatus according to claim 1, wherein
    said controller calculates said reference value using a value corresponding to lightness of said white reference member read by said reading mechanism.

6. The image reading apparatus according to claim 1, wherein
    said reading mechanism includes
    a first reading unit for reading one surface of the document conveyed along said conveying path, and
    a second reading unit for reading a rear surface of said one surface without turning over said document with respect to said conveying path during reading by said first reading unit.

7. The image reading apparatus according to claim 1, wherein
    said controller calculates said reference value using the plurality of detection values obtained by reading a same range of said white reference member by said reading mechanism before and after said white reference member moves to the position where said white reference member faces said transparent member.

8. The image reading apparatus according to claim 7, wherein
    said controller calculates said reference value using a maximum value or an average value of said plurality of detection values obtained by reading the same range of said white reference member by said reading mechanism before and after said white reference member moves to the position where said white reference member faces said transparent member.

9. A control method of an image reading apparatus, comprising the steps of:
    accepting an instruction to read a document;
    moving a white reference member to a position where said white reference member faces a transparent member provided at a prescribed reading position on a conveying path, and causing a reading mechanism to optically read said white reference member through said transparent member;
    after reading said white reference member, moving an elastic member to a position where said elastic member faces said transparent member, bringing said elastic member into contact with a surface of said transparent member facing toward said conveying path, and cleaning the surface;

after cleaning, moving again said white reference member to the position where said white reference member faces said transparent member, and causing said reading mechanism to optically read said white reference member through said transparent member; and calculating a reference value used in shading correction in said reading mechanism using a plurality of detection values obtained in the step of causing said reading mechanism to optically read said white reference member when said white reference member is located at the position where said white reference member faces said transparent member, before and after said elastic member moves to the position where said elastic member faces said transparent member.

10. The control method according to claim 9, wherein said white reference member is located at a standby position different from said reading position and opposite to said reading mechanism with said transparent member and said conveying path interposed between said white reference member and said reading mechanism, and in said step of moving a white reference member to a position where said white reference member faces a transparent member, said white reference member is moved from said standby position to the position where said white reference member faces said transparent member, and then, is returned to said standby position.

11. The control method according to claim 9, wherein said image reading apparatus includes a rotating body having said white reference member and said elastic member on a surface of said rotating body, and said rotating body is positioned to face said transparent member, and has a rotation axis in a plane parallel to said transparent member having a plate shape, and in said step of moving a white reference member and said step of moving an elastic member, said rotating body is rotated to move said white reference member to the position where said white reference member faces said transparent member and to move said elastic member to the position where said elastic member faces said transparent member.

12. The control method according to claim 9, wherein widths of said white reference member and said elastic member in a direction orthogonal to a conveying direction along said conveying path are each larger than a width of the document conveyed along said conveying path in the direction orthogonal to said conveying direction.

13. The control method according to claim 9, wherein in said step of calculating a reference value, said reference value is calculated using a value corresponding to lightness of said white reference member read by said reading mechanism.

14. The control method according to claim 9, wherein said reading mechanism includes a first reading unit for reading one surface of the document conveyed along said conveying path, and a second reading unit for reading a rear surface of said one surface without turning over said document with respect to said conveying path during reading by said first reading unit.

15. The control method according to claim 9, wherein in said step of calculating a reference value, said reference value is calculated using the plurality of detection values obtained by reading a same range of said white reference member by means of said reading mechanism in each of said step of moving a white reference member to a position where said white reference member faces a transparent member and causing a reading mechanism to read said white reference member and said step of moving said white reference member to the position where said white reference member faces said transparent member and causing said reading mechanism to read said white reference member.

16. The control method according to claim 15, wherein in said step of calculating a reference value, said reference value is calculated using a maximum value or an average value of the plurality of detection values obtained by reading the same range of said white reference member by means of said reading mechanism in each of said step of moving a white reference member to a position where said white reference member faces a transparent member and causing a reading mechanism to read said white reference member and said step of moving said white reference member to the position where said white reference member faces said transparent member and causing said reading mechanism to read said white reference member.

* * * * *